UNITED STATES PATENT OFFICE.

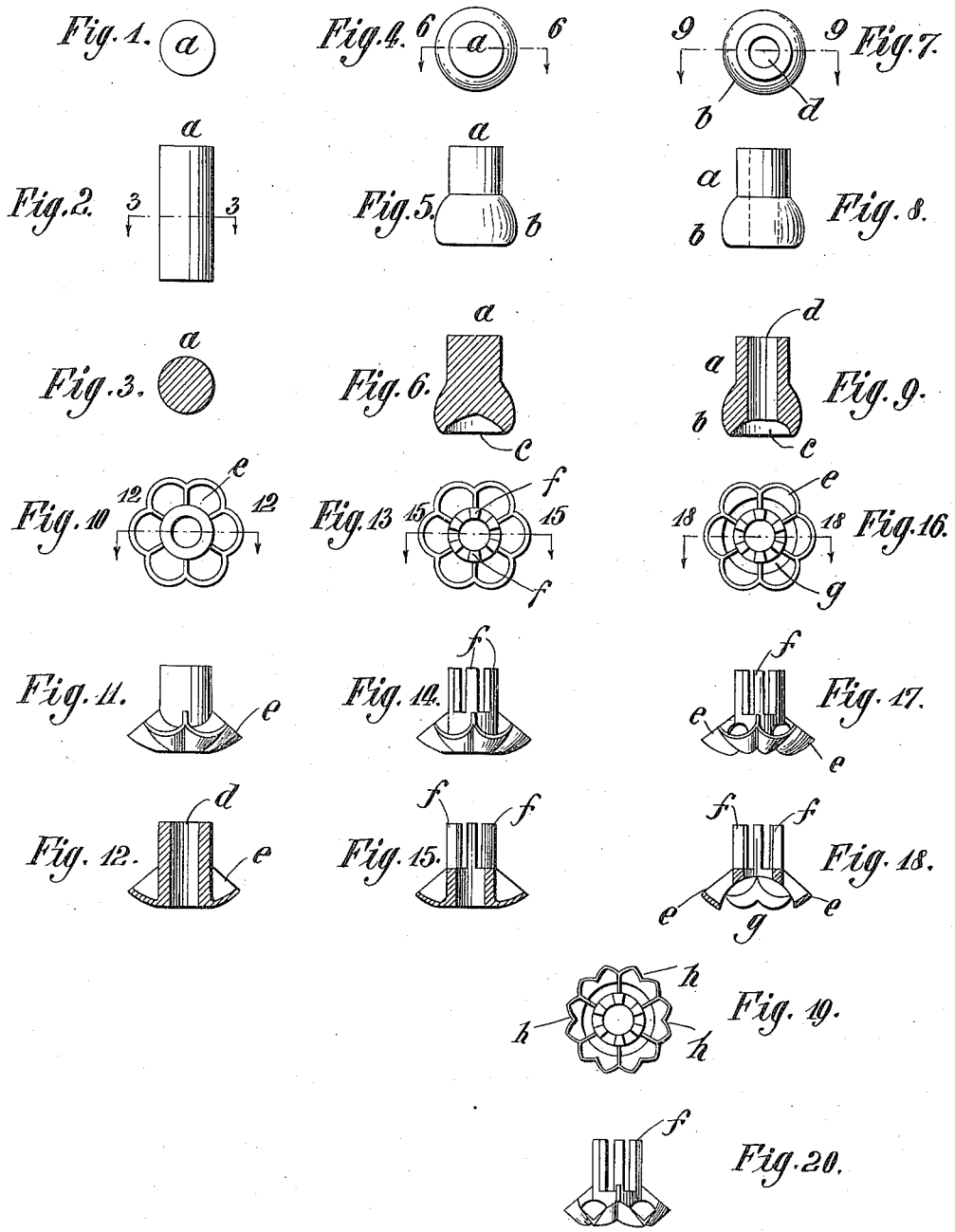

SAMUEL N. STONE, OF ATTLEBORO, MASSACHUSETTS, ASSIGNOR TO J. J. SOMMER AND CO., OF NORTH ATTLEBORO, MASSACHUSETTS.

METHOD OF FORMING SETTINGS FOR PRECIOUS STONES, &c.

1,157,598.  Specification of Letters Patent.  Patented Oct. 19, 1915.

Application filed February 1, 1915. Serial No. 5,551.

*To all whom it may concern:*

Be it known that I, SAMUEL N. STONE, a citizen of the United States, and a resident of Attleboro, county of Bristol, and State of Massachusetts, have invented certain new and useful Methods of Forming Settings for Precious Stones, &c., of which the following is a specification.

My invention relates to the method of forming the mounts or "settings" for precious stones, &c., which are articles of manufacture for jewelers' use, the trade being supplied by wholesale manufacturers, and the settings being designed and adapted for use as mounts in the embellishment of various articles of jewelry with which the settings are incorporated in a manner well known in the art. As heretofore constructed these "settings" have been made in two parts,—the base and the crown or bur, the prongs of which latter eventually form the means of attachment of the jewel,—said base and said crown being soldered together to constitute the mount. This method of construction is however objectionable for several practical reasons. It is expensive on account of the time and labor involved, the operation of soldering the parts together particularly being a delicate one, requiring exceptional skill and care, and even then the solder is apt to spread or spill over the adjacent surfaces to the detriment of the setting. Furthermore the heat necessarily involved in the soldering operation tends to anneal and soften the gold of which such mounts are usually composed,—and the structure as a whole although integral, lacks the requisite strength and stability. My invention is the result of experimental investigation undertaken for the express purpose of obviating these difficulties and producing if possible a mount of this character complete in every particular fashioned from a solid billet or blank of metal, and this we have accomplished as hereinafter set forth, attaining a one piece, integral structure unimpaired by heat or solder and of uniform strength and tenacity throughout all its parts,—and this without the employment of highly skilled labor, and in a much more economical manner than heretofore,—the surfaces also being perfectly smooth and capable of a high degree of uniform polish, so that a mount of exceptional strength and beauty is insured.

In the accompanying drawings, Figure 1, is an end view of the cylindrical blank or billet; Fig. 2, a side elevation thereof; and Fig. 3, a cross section upon plane of line 3—3 Fig. 2; Fig. 4, is an upper end view of the blank after swaging to form the incipient base; Fig. 5, a side elevation thereof; and Fig. 6, a central longitudinal section taken upon plane of line 6—6 Fig. 4; Figs. 7, 8, and 9, are views respectively like unto the last three named, showing the blank after it has been drilled axially; Figs. 10, 11, and 12, show the result of dapping; Figs. 13, 14, and 15, show the result of the burring operation; Figs. 16, 17, and 18, show the result of boring out the under side of the base; and Figs. 19, and 20, the result of the edge cutting or scalloping operation.

The drawings are made upon a scale approximately four times larger than the product.

In the practical application of my invention I have found it most expedient to use a cylindrical blank or billet $a$, shown in the first three figures of the drawings. By swaging this is brought into the form shown in Figs. 4, 5, and 6, forming the bulb $b$, with the concavity $c$. The longitudinal axial hole $d$, is then drilled, resulting in the form shown in Figs. 7, to 9, inclusive. By dapping I then form the annular series of cup shaped depressions $e, e$, shown in Figs. 10, to 12, inclusive; and next bur or slit the shank or upper portion of the blank longitudinally to form the series of prongs $f, f$, shown in Figs. 13, 14, and 15, which are subsequently used in the mounting of a diamond or other desired object in the manner well known in the art. After this operation of burring I next bore or ream out the under side of the mount to form the concavity $g$, (Figs. 16, 17, and 18,) thereby opening up the setting for admission of light to the rear of the jewel when mounted between the prongs $f, f$, &c. Finally I cut or notch the edges of the remnants of cups $e, e$, to form scallops $h, h$, as shown in Figs. 19, and 20, to further open up and lighten the setting and enhance the attractive appearance thereof. The mount is then polished in the usual way, after which it is ready for the market and use. All these operations are adapted to be performed by mechanical processes in which skilled and expensive labor is not essential, and the result is a light but substantial unitary structure without stain or blemish, and especially adapted to the requirements of the trade.

What I claim as my invention and desire to secure by Letters Patent is,

1. The method herein set forth of forming a setting of the character designated, consisting essentially in swaging a metallic blank to form a bulbous incipient base, drilling the blank axially, dapping the bulbous base to form an annular series of cup-shaped depressions, slitting the shank longitudinally to form prongs for the reception of the object to be mounted, and reaming out the under side of the base, for the purpose described.

2. The method herein set forth of forming a setting of the character designated, consisting essentially in swaging a cylindrical metallic blank to form a bulbous base with a concavity in its under side, drilling the blank axially, dapping the bulbous base to form an annular series of cup-shaped depressions, slitting the shank longitudinally to form prongs for the reception of object to be mounted, reaming out the under side of the base, and scalloping the edges thereof, substantially as and for the purposes set forth.

SAMUEL N. STONE.

Witnesses:
JAMES E. TOTTEN,
E. L. LOUGHLIN.

Copies of this patent may be obtained for five cents each, by addressing the "Commissioner of Patents, Washington, D. C."